United States Patent [19]

Heeps

[11] Patent Number: 5,322,705

[45] Date of Patent: Jun. 21, 1994

[54] PROCESS FOR MAKING A COOKED, PUREED FOOD PRODUCT WHICH VISUALLY RESEMBLES THE ORIGINAL FOOD PRODUCT

[76] Inventor: James W. Heeps, 4028 Walnut St., Allentown, Pa. 18104

[21] Appl. No.: 997,557

[22] Filed: Dec. 28, 1992

[51] Int. Cl.$^5$ .................... A23L 1/314; A23L 1/317
[52] U.S. Cl. .................... 426/646; 426/513; 426/800
[58] Field of Search ............... 426/272, 615, 646, 413, 426/513, 574, 641, 800

[56] References Cited

U.S. PATENT DOCUMENTS

| | | | |
|---|---|---|---|
| 3,615,693 | 10/1971 | Billerbeck et al. | 426/272 |
| 3,920,853 | 11/1975 | Middendorf et al. | 426/104 |
| 3,934,050 | 1/1976 | Hawkins | 426/645 |
| 3,962,335 | 6/1976 | Kumar | 426/574 |
| 4,000,323 | 12/1976 | Youngquist | 426/93 |
| 4,001,441 | 1/1977 | Liepa | 426/104 |
| 4,071,635 | 1/1978 | Lindl et al. | 426/646 X |
| 4,126,704 | 11/1978 | McCarthy et al. | 426/304 |
| 4,132,810 | 1/1979 | Knutson | 426/104 |
| 4,163,805 | 8/1979 | Mueller | 426/575 |
| 4,303,008 | 12/1981 | Hice et al. | |
| 4,305,965 | 12/1981 | Cheney | 426/104 |
| 4,338,340 | 7/1982 | Morimoto et al. | 426/104 |
| 4,348,420 | 9/1982 | Lynch et al. | 426/646 X |
| 4,419,375 | 12/1983 | Willard et al. | 426/272 |
| 4,472,448 | 9/1984 | Haggerty et al. | 426/646 X |
| 4,539,210 | 9/1985 | O'Connell et al. | 426/56 |
| 4,544,560 | 10/1985 | O'Connell | 426/104 |
| 4,622,234 | 11/1986 | Okada | 426/643 |
| 4,728,524 | 3/1988 | Gagliardi, Jr. | 426/272 |
| 4,731,906 | 3/1988 | Matthews et al. | |

Primary Examiner—Arthur L. Corbin
Attorney, Agent, or Firm—Jacobson, Price, Holman & Stern

[57] ABSTRACT

Pureed, cooked food products, especially meat products, which visually resemble a non-pureed version of the cooked food product, and a process for producing pureed, cooked food products. The process includes the steps of grinding a cooked food product to form ground cooked food particles; mixing pregelatinzed starch and a cook-up starch with the ground cooked food particles; adding a liquid to the food particles/starch mixture and mixing to form a pureed cooked food product; and then shaping the pureed cooked food product into a desired shape which visually resembles the original cooked food product. The shaped, pureed cooked food products can then be frozen for storage, cut into desired serving portions and reheated for serving. The pureed cooked food product is especially suitable for feeding patients suffering from a medical condition which impairs their chewing and/or swallowing capability.

10 Claims, 1 Drawing Sheet

PROCESS FOR MAKING A COOKED, PUREED FOOD PRODUCT WHICH VISUALLY RESEMBLES THE ORIGINAL FOOD PRODUCT

BACKGROUND OF THE INVENTION

The present invention relates to a cooked pureed food product, particularly a cooked pureed meat product, and to a process for making formed pureed food products from their original cooked counterparts. The resulting product resembles the original cooked food in portioned forms, and can be reheated to about 180–200° F. for serving in commercial operations.

The pureeing of foods in healthcare facilities is common practice for feeding patients with impaired swallowing or chewing abilities. Typically, a liquid is added to make the food into a puree which is more fluid and facilitates swallowing; however, two problems exist with this basic approach. First, many long term healthcare patients die from aspiration. Since purees contain free liquid which presents the danger of aspiration, this approach is less than adequate for such patients. Second, most pureed foods have the same unpleasant visual appearance. Patients who are mentally alert, but eating-impaired, have little desire to eat such foods, and as a result, some patients suffer from reduced food consumption and malnutrition. Nutritional supplements, therefore, become necessary in order to compensate for this reduced food consumption.

Prior attempts have been made to re-form meat products. Examples of such attempts at re-forming meat products include U.S. Pat. Nos. 4,544,560 to O'Connell and U.S. Pat. No. 4,539,210 to O'Connell et al. These patents describe the re-forming of meat products by binding a raw meat product. Although the re-formed product may subsequently be cooked during processing and sold as a cooked product, it is re-formed prior to cooking. More specifically, the protein from a raw meat product is used to bind the re-formed end product which is also raw. Since proteins in cooked meats are denatured, having little or no binding capability, the processes described in these two prior patents are not applicable to re-forming previously cooked meats. Because the re-formed meat product of these two patents is raw, more than a mere reheating of the product is required before it is ready for consumption. Other examples of prior formed meat products which are cooked include mince bologna and hot dogs, which begin with a raw finely chopped emulsion and yield a cooked product with too great of a bind for eating-impaired patients.

SUMMARY OF THE INVENTION

It is a primary object of the present invention to overcome the disadvantages of the prior art by providing a cooked food product which is easily recognized, has a pleasant appearance, includes no free liquid, and can be swallowed using only the tongue. In a preferred embodiment, the food product is a meat product. However, the invention is also applicable to other food products, including vegetables like cooked carrots and french fries, and seafood, which are heated prior to serving. References hereinafter to meat products are to a preferred embodiment and are not to be construed as limiting of the invention. The processes and products described with reference to meat are also applicable to other foods.

It is a further object of the present invention to provide a process for manufacturing a cooked meat product which can be ingested without chewing, resembles the original cooked meat, contains no free liquid, can retain its shape when molded, portioned, and reheated to about 180° to 200° F., can retain its shape when handled hot for serving to patients, and can be eaten using a fork.

In the process of the present invention, a cooked meat product is ground or chopped to obtain a reduced particle size so that the mouth feel of the product (as is, without added liquid) does not require chewing prior to swallowing. Modified food starches are then mixed with the ground or chopped meat product. Liquid is then added in the form of water and/or broth to create a desired puree consistency. In the process and product of the present invention, the modified food starches bind liquid. In the meat product of the invention, the meat fibers initially absorb the added liquid and retain the added liquid until the meat product is reheated. As heat is applied, the liquid cooks out of the meat fibers and one of the modified food starches is activated by the heat. The heat-activated starch binds the freed liquid, in effect suspending the heated meat fibers amid the starch and liquid bonds.

Excess total water is undesirable because it results in poor binding and handling of the pureed cooked food product, and noticeable shrinkage upon serving. Accordingly, the total amount of water added is carefully regulated. In addition, the total fat content of a re-formed meat product is regulated for flavor and bind. This is primarily done by limiting the fat content of the original meat, but, if necessary, the fat content can be increased with the addition of a rendered fat. The added liquid and fat are mixed into the ground cooked meat/starch mixture, for example, using a mixer. The final pureed cooked meat product is formed into desired shapes (for example, log shapes) using a suitable apparatus such as a vacuum stuffer and the thus re-formed meat product is subsequently frozen. The frozen re-formed meat product is then cut into desired serving portions.

The inventive process has applications in, but is not limited to, the manufacture of pureed hot dogs in hot dog form, and other pureed meats in their respective non-pureed form including slices or slabs of roast beef, corned beef, chicken and ham. As noted above, the inventive process also has applications in the manufacture of pureed vegetables and pureed seafood, in their respective non-pureed forms.

Additional objects and advantages of the present invention will be further understood by reference to the following detailed description of the invention and to the drawing wherein:

DETAILED DESCRIPTION OF THE INVENTION

Figure 1:
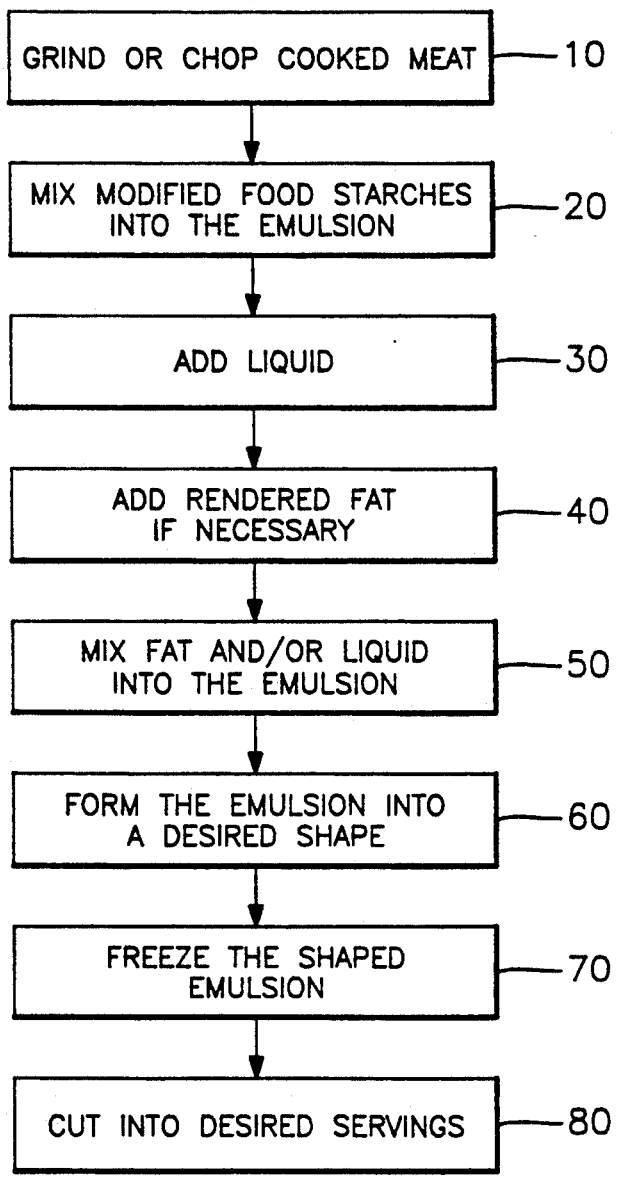
FIG. 1 is a flow chart illustrating a process for manufacturing cooked, pureed, and re-formed meat products in accordance with the present invention.

A preferred process, according to the present invention, for manufacturing cooked, pureed, and formed meat products will now be described with reference to FIG. 1.

Initially, in step 10, a cooked meat product is ground or chopped. The grinding or chopping continues until the resulting meat particles are sufficiently reduced in size to preclude the need for chewing prior to ingestion. Preferably, the cooked meat initially has a fat content ranging from about 3% to 30%, more preferably about 10% to 20%, based on the weight of the fat-containing cooked meat, depending on the type of meat used and the desired flavor and level of binding to be achieved in the final re-formed meat product.

In step 20, modified food starch is mixed with the meat particles produced in step 10. The type of modified food starch used depends on the conditions under which the starch must perform. Three determinative conditions are temperature, freeze/thaw stability and shear resistance. In the present invention, the primary consideration is that the product is to be heated to about 180° F. prior to serving. In addition, freezing is one of the subsequent process steps. Therefore, the modified food starch must perform in the 160° to 200° F. range and have a high freeze/thaw stability. Shear resistance is less of a consideration in the present invention because the process does not subject the starch to any harsh mechanical processing.

There are three bases for food starches: corn, tapioca and waxy maize. Each can be modified to enhance or repress its inherent properties to satisfy a specific application. Any of these food starches can be used in the present process. Additional factors to be considered in evaluating a particular starch's performance include shelf stability, moisture retention and smooth mouth feel.

In an especially preferred embodiment of the invention, two modified food starches are used. One is a pregelatinized (cold or instant) starch. This pregelatinized starch binds excess free liquid not absorbed by the meat fibers in the meat/starch/liquid mixture during initial processing. This pregelatinized starch is included in an amount of about 0.8% by weight, based on the weight of the meat plus added liquid and added fat, if any. The second starch is a cook-up starch which is heat activated at approximately 159° F. The saturated meat fibers give up moisture when heated and this cook-up starch binds the freed liquid and, in effect, keeps the meat fibers moist and suspended during and after reheating. The cook-up starch is added in an amount of about 3% to 9% by weight, based on the weight of the meat plus added liquid and added fat, if any. In general, increased levels of this cook-up starch increases bind; however, too much cook-up starch can impart a starchy taste and texture to the final product. Also, as the amount of cook-up starch increases, the final product beings to display a melting effect when heated, with shaped product losing it shape and flattening out.

A number of corn-, tapioca- and waxy maize-based pregelatinized starches and a number of corn-, tapioca- and waxy maize-based cook-up starches which are heat activated at or about 159° F. are commercially available, for example, from National Starch and Chemical Company. Selection of particular pregelatinized and cook-up starches can be made from among these commercially available modified food starches.

In step 30, liquid is added to the cooked ground meat/modified food starch mixture to create the desired puree consistency. This liquid is preferably either water and/or a broth. The proper amount of added liquid yields a final product having a mashed potato consistency when reheated and ready to be served. The amount of added liquid ranges from about 12% to 32% by weight, based on the weight of the original meat product. The amount of liquid required varies with different meat products. Cooked fish, pork and chicken (with no added ingredients) require about 12% to 19% by weight added liquid. Ham, hot dogs, corned beef and seasoned roast beef (all of which have previously added ingredients) require about 25% to 32% by weight added liquid. The actual amount of added liquid is determined by taste and mouth feel of the final reheated product.

Because excess total water results in poor binding and handling of the final re-formed meat product, as well as noticeable shrinkage upon serving, it is important to carefully control the total water content of the final re-formed meat product during production. In particular, control points to avoid liquid loss include: adding the liquid to the ground or chopped meat/modified food starch mixture in a sealed mixer because equipment such as a mixer grinder or mixers with side discharges would permit added liquid which is not immediately absorbed to run out; adding a pregelatinized food starch to bind free liquid not absorbed by the meat particles or that weeps out during processing; and freezing the meat/starch/liquid mixture as rapidly as possible to reduce the segregation of meat particles and liquid.

Step 40 is an optional step in which the total fat content of the cooked ground meat/modified food starch/liquid mixture of step 30 can be increased to achieve a desired flavor and level of binding in the final re-formed meat product. Although fat regulation is primarily accomplished by controlling the fat content of the original cooked meat product, the total fat content may nevertheless be further increased by adding a rendered fat in step 40. Preferably, the fat content of the final, re-formed cooked meat product is between about 3% and 20%, most preferably, between about 6% and 15%, by weight, based on the weight of the final product. Flavor is the primary criteria in determining fat content. Products such as chicken and beef derive their flavor from fat and best results are obtained in the 8% to 15%, by weight, fat range. Flavor in corned beef comes from the pickle or cure. Increasing the fat content dilutes the flavor. An intense corned beef flavor is achieved in the 3% to 6%, by weight, fat range.

Other factors in determining fat content include: the physical appearance and mouth feel of the final product upon serving, with higher fat levels creating a product with a greasy surface appearance and mouth feel; the improvement in inhibiting surface drying and heat retention, when the final product is served, which is achieved with increased fat levels; the cost of the meat, which is directly proportional to the fat content; and the product bind, which is important for handling when serving the meat product, which decreases as fat levels increase.

In step 50, the liquid added in step 30 and the fat, if any, added in step 40 are mixed into the meat/food starch mixture using a mixer, preferably a sealed mixer as discussed above.

Next, in step 60, the final meat/food starch/liquid/optional added fat mixture is formed into a desired shape using conventional apparatus such as a vacuum stuffer. Examples of suitable shapes for the final product at this stage include a log shape, hot dog shape, and a center cut cod loin shape. Alternatively, the final meat/food starch/liquid/optional added fat mixture can be formed using a patty forming machine. In order to use a patty forming machine, the meat/food starch/liquid/optional added fat mixture would have to be stiffened, possibly by chilling, prior to forming. It is also possible to pump or extrude the final meat/food starch-/liquid/optional added fat mixture into dies of the desired final product shape, and then quick freezing and extracting the frozen mixture from the dies.

The final formed mixture is then frozen to a temperature of about −10° to about 10° F. in step 70. It is important that the final formed mixture be brought to a temperature of 10° F. or less as rapidly as possible, i.e., in less than 24 hours, to prevent migration of the liquid from the meat fibers.

After freezing, the final formed mixture is cut into the desired serving size portions at step 80, and then packaged for delivery. While still frozen, i.e., not defrosted, the serving size portions are heated to an internal temperature of about 180° F. in a conventional oven, a convection oven or a microwave prior to serving.

EXAMPLES

Example 1—Pureed Chicken

This is an example of a pureed chicken product made according to the present invention.

100 pounds of cooked chicken meat (no skin) was ground 3 times through a ⅛" plate. 8.42 pounds of LOGEL, a waxy maize-based cook-up starch available from National Starch and Chemical Company, and 1.04 pounds of ULTRA SPERSE M, a waxy maize-based pregelatinized starch from National Starch and Chemical Company, were added and mixed with the ground cooked chicken meat in a paddle mixer for approximately 2 minutes, to produce a uniformly blended ground chicken/starch mixture. 15 pounds of chicken broth containing 16% solids and 15 pounds of rendered chicken fat were added and mixed with the ground chicken/starch mixture in the paddle mixer. The ground chicken/starch/broth/chicken fat mixture was mixed for about 5 minutes, yielding a pasty emulsion.

The pasty emulsion was then placed into a V-mag vacuum stuffer and stuffed into a cylindrical mold forming a log having a length of about 30" and a pear-shaped cross section of about 4 ¼" long and 3 ½" wide. The filled mold was placed in a 0° F. freezer and frozen solid. The resulting frozen log was extracted from the mold and cut into 3 ounce portions on a band saw.

Example 2—Pureed Hot Dogs 100 pounds of cooked hot dog meat was ground times through an ⅛" plate. 9.38 pounds of LOGEL and 1 pound of ULTRA SPERSE M were added and mixed with the ground hot dog meat in a paddle mixer for approximately 2 minutes, to produce a uniformly blended ground hot dog meat/starch mixture.

25 pounds of water was added and mixed with the ground hot dog meat/starch mixture. The ground hot dog meat/starch mixture and water were mixed for about 5 minutes until all of the water was absorbed, yielding a uniform pasty emulsion.

The pasty emulsion was then placed into a V-mag vacuum stuffer and stuffed into 28 mm Callogen casings. The stuffed casings were then hung on a hot dog rack. The stuffed casings were then placed in a 0° F. freezer and frozen solid. Then, the casings were stripped from the frozen meat-containing tubes and the tubes were cut into 6" lengths to provide approximately 2 ounce portions.

Although the present invention has been described with reference to specific examples thereof, it is to be understood that the invention is not limited to these specific embodiments. Certain modifications of the present invention will become subsequently apparent to those having ordinary skill in the art, which modifications are well within the scope of the present invention. In this regard, the present invention is not limited to the examples set out above, but is limited only by the claims appended hereto.

I claim:

1. A process for producing a pureed cooked meat product which visually resembles a non-pureed version of the cooked meat, said process comprising the steps of:
    grinding a cooked meat to form ground cooked meat particles;
    mixing a first modified food starch and a second modified food starch with said ground cooked meat particles to produce a ground meat/starch mixture, said first modified food starch being a pregelatinized starch capable of binding liquid at ambient temperature and said second modified food starch being a cook-up starch capable of binding liquid only after heat activation;
    adding a liquid to said ground meat/starch mixture, said liquid being a member selected from the group consisting of water, broths and mixtures thereof;
    mixing said liquid and said ground meat/starch mixture to produce a pureed cooked meat product;
    shaping said pureed cooked meat product into a shape which visually resembles a non-pureed version of said cooked meat; and then
    freezing the shaped pureed cooked meat product by reducing the temperature thereof to 10° F. or lower in less than 24 hours.

2. The process according to claim 1, further comprising the step of dividing the frozen shaped pureed cooked meat product into individual serving size portions.

3. The process according to claim 1, wherein said first modified food starch is used in an amount of about 0.8% by weight based on the combined weight of said ground meat particles and said liquid.

4. The process according to claim 1, wherein said second modified food starch is used in an amount of about 3% to 9% by weight based on the combined weight of said ground cooked meat particles and said liquid.

5. The process according to claim 1, wherein said liquid is added to said ground meat/starch mixture in an amount of about 12% to 32% by weight, based on the weight of said ground cooked food particles.

6. The process according to claim 1, wherein said first modified food starch is a waxy maize-based starch.

7. The process according to claim 1, wherein said second modified food starch is a waxy maize-based starch.

8. The process according to claim 7, wherein said second modified food starch has a heat activation range between 160 degrees F. and 180 degrees F. and a high freeze/thaw stability.

9. The process according to claim 1, wherein said step of mixing said liquid and said ground meat-starch mixture further comprises emulsifying said liquid and said ground meat-starch mixture.

10. A pureed cooked meat product produced by the process defined in claim 1.

* * * * *